US009467583B2

United States Patent
Roulland et al.

(10) Patent No.: US 9,467,583 B2
(45) Date of Patent: Oct. 11, 2016

(54) SYSTEM AND METHOD FOR SEMI-AUTOMATIC GENERATION OF OPERATING PROCEDURES FROM RECORDED TROUBLESHOOTING SESSIONS

(71) Applicant: Xerox Corporation, Norwalk, CT (US)

(72) Inventors: Frederic Roulland, Le Versoud (FR); Stefania Castellani, Meylan (FR); Fabien Guillot, La Tronche (FR); Yves Hoppenot, Notre-Dame-de-Mésage (FR)

(73) Assignee: XEROX CORPORATION, Norwalk, CT (US)

( * ) Notice: Subject to any disclaimer, the term of this patent is extended or adjusted under 35 U.S.C. 154(b) by 76 days.

(21) Appl. No.: 14/261,027

(22) Filed: Apr. 24, 2014

(65) Prior Publication Data

US 2015/0312427 A1    Oct. 29, 2015

(51) Int. Cl.
*H04N 1/00* (2006.01)
*G06K 15/00* (2006.01)
*G06F 11/07* (2006.01)

(52) U.S. Cl.
CPC ....... *H04N 1/00344* (2013.01); *G06F 11/0733* (2013.01); *G06F 11/0748* (2013.01); *G06F 11/0793* (2013.01); *G06K 15/408* (2013.01); *H04N 1/00408* (2013.01); *H04N 1/00474* (2013.01); *H04N 1/00506* (2013.01); *H04N 1/00954* (2013.01)

(58) Field of Classification Search
None
See application file for complete search history.

(56) References Cited

U.S. PATENT DOCUMENTS

| | | | |
|---|---|---|---|
| 5,490,089 A | 2/1996 | Smith et al. | |
| 7,058,567 B2 | 6/2006 | Ait-Mokhtar et al. | |
| 7,647,534 B2 | 1/2010 | Castellani et al. | |
| 7,715,037 B2 | 5/2010 | Castellani et al. | |
| 7,774,198 B2 * | 8/2010 | Roulland | G06F 17/271 704/9 |
| 7,797,303 B2 * | 9/2010 | Roulland | G06F 17/30654 707/708 |
| 7,823,062 B2 | 10/2010 | Liberty et al. | |
| 8,280,842 B2 | 10/2012 | Roulland et al. | |
| 8,621,362 B2 | 12/2013 | Castellani et al. | |
| 2005/0137843 A1 | 6/2005 | Lux | |
| 2006/0078859 A1 | 4/2006 | Mullin | |
| 2007/0179776 A1 | 8/2007 | Segond et al. | |

(Continued)

OTHER PUBLICATIONS

U.S. Appl. No. 13/849,630, filed Mar. 25, 2013, Proux.

(Continued)

*Primary Examiner* — Nicholas Pachol
*Assistant Examiner* — Pawandeep Dhingra
(74) *Attorney, Agent, or Firm* — Fay Sharpe LLP

(57) ABSTRACT

A method for generating procedures includes receiving a log of a troubleshooting session. The log includes device data including a sequence of detected operations performed on the device causing respective components to change states. Steps of a candidate operating procedure are generated, based on the log, each corresponding to one of the detected operations. Missing steps may be identified, based on state charts and/or stored operability constraints for the device. The candidate operating procedure is compared with existing operating procedures stored in a knowledge base for the device to identify at least one existing operating procedure which includes steps which match at least some of the steps of the candidate operating procedure and, based on the identified at least one existing operating procedure, generating a textual description based on the textual description of the matching steps. The candidate procedure can be presented to an editor for validation.

19 Claims, 7 Drawing Sheets

(56) References Cited

U.S. PATENT DOCUMENTS

| | | | |
|---|---|---|---|
| 2008/0091408 A1* | 4/2008 | Roulland | G06F 17/30672 704/9 |
| 2008/0126860 A1 | 5/2008 | Sampath et al. | |
| 2008/0294423 A1 | 11/2008 | Castellani et al. | |
| 2009/0106224 A1* | 4/2009 | Roulland | G06F 17/30646 |
| 2009/0292700 A1 | 11/2009 | Castellani et al. | |
| 2010/0149571 A1 | 6/2010 | Thieret et al. | |
| 2010/0229080 A1 | 9/2010 | Roulland et al. | |
| 2011/0175901 A1 | 7/2011 | Meunier et al. | |
| 2011/0270771 A1 | 11/2011 | Coursimault et al. | |
| 2012/0150920 A1* | 6/2012 | Roulland | G06F 17/30734 707/805 |
| 2012/0290288 A1 | 11/2012 | Ait-Mokhtar | |
| 2013/0197899 A1 | 8/2013 | Roulland et al. | |

OTHER PUBLICATIONS

O'Neill, et al. "From ethnographic study to mixed reality: collaborative troubleshooting system", CSCW'11, ACM, pp. 225-234 (2011).

Roulland, et al. "Mixed reality for supporting office devices troubleshooting", Proc. Virtual Reality 2011 Conference, IEEE Computer Society, pp. 175-178 (2011).

Roulland, et al. "Query suggestion for on-device troubleshooting", 12$^{th}$ IFIP TC13 Conf. in Human-Computer Interaction, pp. 1-4 (2009).

Castellani, et al. "Mobile 3D representations for device troubleshooting", World Conf. on Innovative Virtual Reality, pp. 1-10 (2011).

* cited by examiner

SYSTEM AND METHOD FOR SEMI-AUTOMATIC GENERATION OF OPERATING PROCEDURES FROM RECORDED TROUBLESHOOTING SESSIONS

BACKGROUND

The exemplary embodiment relates to maintenance and repair of a device and finds particular application in connection with a system for generating operating procedures for maintenance or repair of an electromechanical device, such as a printer.

Operating procedures, such as maintenance and repair procedures used in troubleshooting problems with devices, are often provided to customers in a technical manual in the form of paper or digital documentation. In some cases, the procedures may be in the form of a set of problems and corresponding solutions which may be stored in indexed form in a knowledge base. When a user of the device wishes to identify the cause of a problem with the device or perform maintenance, the documentation is reviewed to find relevant information on the procedures which should be performed on the device, often through keyword searching.

This type of user support suffers from several limitations. For example, creating and maintaining a knowledge base of procedures is expensive. It generally entails generating a first set of procedures before the launch of a product that describes the periodic maintenance and repair procedures expected over the product life. It is then iteratively updated during the life of the product when issues are encountered by users and solutions to problems are identified by technical support personnel. This process is even more problematic when the devices being supported have a very short lifecycle and/or wide variability (e.g., in the case of printing devices or mobile phones).

Technical knowledge bases are often used for self-help web sites targeted to device users or agents answering remote calls in a call center. In the latter case, the agents may receive a number of requests with the same problems to be solved. Reviewing these interactions can be used to identify the descriptions of new problems for a given device and the associated solutions in order to enrich the knowledge base. Often, there is a fairly formalized way for technical support agents to provide feedback to knowledge base editing teams in order for them to enrich a knowledge base from the instructions they provided to the customer. However, the process of capturing this information is manually intensive and does not always identify the solution correctly, for example, because not all the steps are recorded by the agent or because the user has not performed the steps as specified.

There remains a need for a system and method to update a knowledge base that incorporates the problems faced by users of the device and the solutions developed.

INCORPORATION BY REFERENCE

The following references, the disclosures of which are incorporated herein by reference, relate generally to troubleshooting systems and methods: U.S. Pub. No. 20050137843, published Jun. 23, 2005, entitled METHOD AND APPARATUS FOR AUTHORING DOCUMENTS USING OBJECT-BASED ELEMENTS AS AN INTERACTION INTERFACE, by Veronika Lux; U.S. Pub. No. 20080294423, published Nov. 27, 2008, entitled INFORMING TROUBLESHOOTING SESSIONS WITH DEVICE DATA, by Stefania Castellani, et al.; U.S. Pub. No. 20090106224, published Apr. 23, 2009, entitled REAL-TIME QUERY SUGGESTION IN A TROUBLE SHOOTING CONTEXT, by Frederic Roulland, et al.; U.S. Pub. No. 20090292700, published Nov. 26, 2009, entitled SYSTEM AND METHOD FOR SEMI-AUTOMATIC CREATION AND MAINTENANCE OF QUERY EXPANSION RULES, by Stefania Castellani; et al.; U.S. Pub. No. 20100149571, published Jun. 17, 2010, entitled METHOD AND APPARATUS FOR AUTOMATED CALL ASSISTANCE FOR MALFUNCTIONS IN AN IMAGE PRODUCTION DEVICE, by Tracy E. Thieret, et al.; U.S. Pub. No. 20100229080, published Sep. 9, 2010, entitled COLLABORATIVE LINKING OF SUPPORT KNOWLEDGE BASES WITH VISUALIZATION OF DEVICE, by Frederic Roulland, et al.; U.S. Pub. No. 20110270771, published Nov. 3, 2011, entitled SYSTEM AND METHOD FOR A FLEXIBLE MANAGEMENT OF THE ESCALATION OF SUPPORT FOR DEVICES, by Jean-Marc Coursimault, et al., U.S. Pub. No. 20120150920, published Jun. 14, 2012, entitled METHOD AND SYSTEM FOR LINKING TEXTUAL CONCEPTS AND PHYSICAL CONCEPTS, by Frederic Roulland, et al.; U.S. Pub. No. 20130197899, published Aug. 1, 2013, entitled SYSTEM AND METHOD FOR CONTEXTUALIZING DEVICE OPERATING PROCEDURES, by Frederic Roulland, et al.; U.S. Pat. No. 5,490,089, issued Feb. 6, 1996, entitled INTERACTIVE USER SUPPORT SYSTEM AND METHOD USING SENSORS AND MACHINE KNOWLEDGE, by Craig A. Smith, et al.; U.S. Pat. No. 7,647,534, issued Jan. 12, 2010, entitled METHOD FOR AVOIDING REPETITION OF USER ACTIONS BY USING PAST USERS' EXPERIENCES, by Stefania Castellani, et al.; U.S. Pat. No. 7,715,037, issued May 11, 2010, entitled BI-DIRECTIONAL REMOTE VISUALIZATION FOR SUPPORTING COLLABORATIVE MACHINE TROUBLESHOOTING, by Stefania Castellani, et al.; U.S. Pat. No. 7,823,062, issued Oct. 6, 2010, entitled INTERACTIVE ELECTRONIC TECHNICAL MANUAL SYSTEM WITH DATABASE INSERTION AND RETRIEVAL, by Matthew R. Liberty, et al; U.S. Pat. No. 8,280,842, issued Oct. 2, 2012, entitled COLLABORATIVE LINKING OF SUPPORT KNOWLEDGE BASES WITH VISUALIZATION OF DEVICE, by Frederic Roulland, et al.; U.S. Pat. No. 8,621,362, issued Dec. 31, 2013, entitled MOBILE SCREEN METHODS AND SYSTEMS FOR COLLABORATIVE TROUBLESHOOTING OF A DEVICE, by Stefania Castellani, et al.; and U.S. application Ser. No. 13/849,630, filed Mar. 25, 2013, entitled ASSISTED UPDATE OF KNOWLEDGE BASE FOR PROBLEM SOLVING, by Denys Proux.

BRIEF DESCRIPTION

In accordance with one aspect of the exemplary embodiment, a method for generating operating procedures includes receiving a log of a troubleshooting session in which a user has performed operations on a device, the session log including data from the device. The device data includes a sequence of detected operations performed on the device, each detected operation causing a component of the device to change states. Steps of a candidate operating procedure are generated, based on the log, each of the steps corresponding to one of the detected operations. Provision may be made for identifying missing steps of the candidate operating procedure based on a device model. The device model includes at least one of: state charts for a plurality of components of the device, and stored operability constraints that specify the state of another component in order for an operation to be performed on a given component. The candidate operating procedure is compared with existing operating procedures stored in a knowledge base for the device to identify at least one existing operating procedure which includes steps which match at least some of the steps of the candidate operating procedure. Based on the identified at least one existing operating procedure, a textual description is generated, based on the textual description of the matching steps. The candidate operating procedure is presented to an editor for validation.

At least one of the generating, identifying, and comparing may be performed with a computer processor.

In accordance with another aspect of the exemplary embodiment, a system for generating operating procedures includes memory which stores a device model. The device model includes state charts for a plurality of components of the device and operability constraints for at least some of the components. A procedure generator receives a log of a troubleshooting session in which a user has performed operations on a device. The log includes data from the device. The device data includes a sequence of detected operations performed on the device, each detected operation causing a component of the device to change states. The procedure generator also generates steps of a candidate operating procedure based on the log, each of the steps corresponding to one of the detected operations, identifies missing steps of the candidate operating procedure based on the device model, and compares the candidate operating procedure with existing operating procedures stored in an associated knowledge base for the device to identify at least one existing operating procedure which includes steps which match at least some of the steps of the candidate operating procedure. Based on the identified at least one existing operating procedure, the procedure generator generates a textual description based on the textual description of the matching steps. The procedure generator generates a graphical user interface for presenting the candidate operating procedure to an editor for validation. A processor in communication with the memory implements the procedure generator.

In accordance with another aspect of the exemplary embodiment, a method for generating operating procedures includes, with an interface generator, conducting a troubleshooting session in which a user receives instructions based on operating procedures stored in a knowledge base and performs operations on a device. A log of the troubleshooting session is generated. The log including data from the device. The device data includes a sequence of detected operations performed on the device, each detected operation causing a component of the device to change states. Steps of a candidate operating procedure are generated, based on the log, each of the steps corresponding to one of the detected operations. The candidate operating procedure is compared with existing operating procedures stored in a knowledge base for the device to identify at least one existing operating procedure which includes steps which match at least some of the steps of the candidate operating procedure and, based on the identified at least one existing operating procedure, a textual description is generated, based on the textual description of the matching steps. The candidate operating procedure is output.

One or more of the generating and comparing may be performed with a computer processor.

DETAILED DESCRIPTION

Aspects of the exemplary embodiment relate to a system and method for proposing updates to a knowledge base which make use of recorded logs of troubleshooting sessions. The method facilitates semi-automated creation of new procedures in the knowledge base. In particular, a device troubleshooting session within a virtual environment is recorded in order to help the editors of the knowledge base procedures to generate a textual procedure to be added to the technical support knowledge base of that device. The exemplary method provides for contextualizing the applicability of the procedures, the automated definition of some or all of the steps of the procedures, natural language text generation for each of these steps, and assisted review of the resulting procedure.

Figure 1:
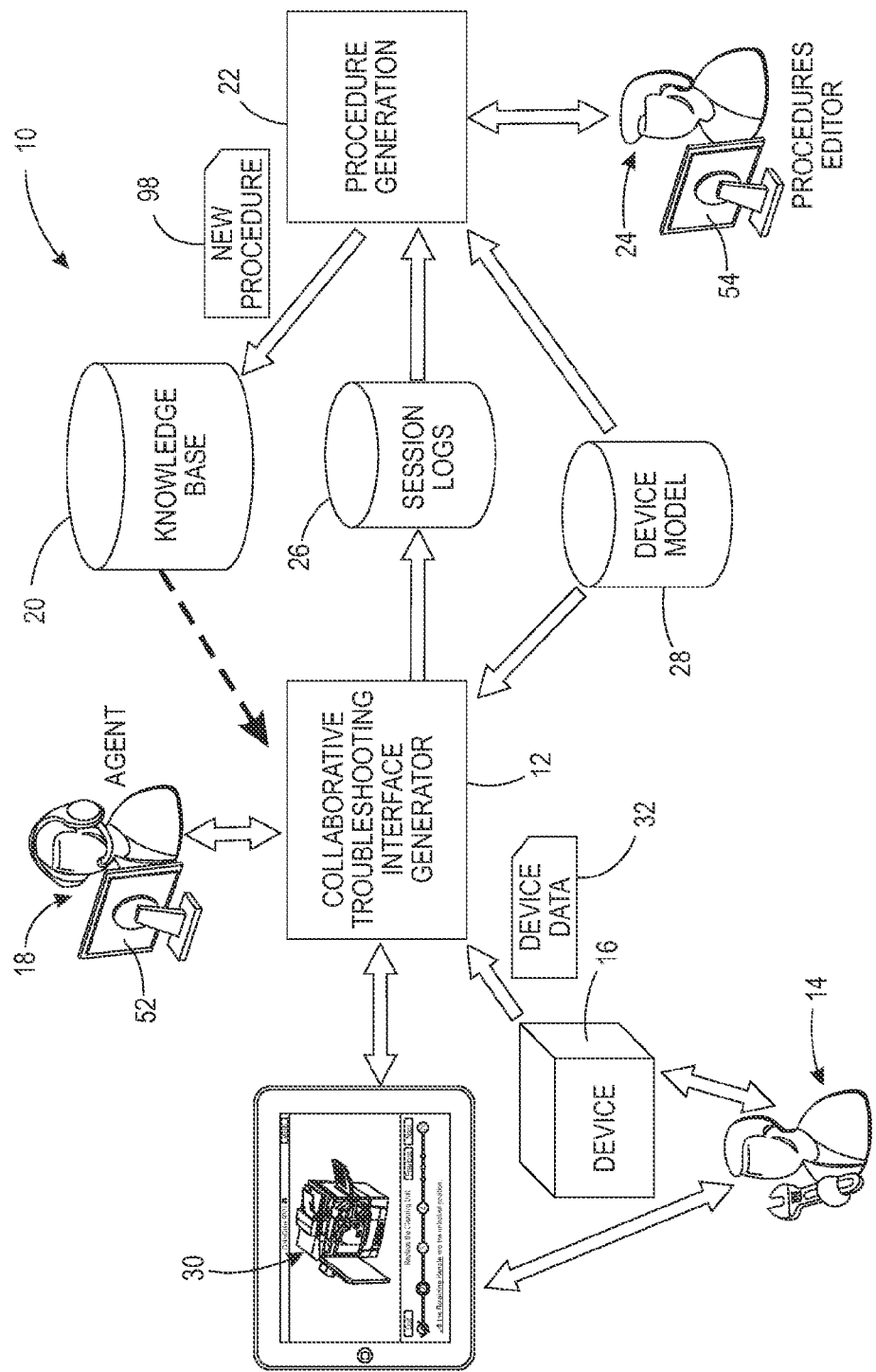
FIG. 1 is an overview of the exemplary system and method.

FIG. 1 provides an overview of an environment in which a procedure generation system 10 operates. The system includes or has access to a collaborative troubleshooting interface generator 12, which is used to assist a particular device user 14 experiencing a problem with a physical device 16 during a troubleshooting session. During the troubleshooting session, an expert, such as an agent 18, who is located in a remote help desk, may propose a solution to a problem faced by the user by providing a verbal or textual description of the steps of a solution. For generating the proposed description, the agent may use an existing technical support knowledge base 20 for the device. The knowledge base 18 may also be available to users so that they can look at existing documented procedures that could solve the problem being experienced. The knowledge base 20 includes a set of procedures for solving known problems with the device. The agent 18 may provide a modified or new procedure if the procedures retrieved from the knowledge base 20 do not appear to provide a solution to the problem.

A procedure generator 22 of the system is configured for recording a new procedure into the knowledge base 18 through interaction with a human procedures editor 24, e.g., at the end of the session. The procedure generator 22 has access to a session log 26 of the troubleshooting session. The session logs may each include a set of user interactions with a given device (e.g., as a sequence of recorded operations performed on the device 16), related device data, and optionally recordings of remote exchange with the help desk, all of which is time stamped. The procedure generator 22 also has access to a device model 28 for the device on which the troubleshooting session was based. The device model 28 is a virtual representation of the device that models not only the visual representation of the device but also a conceptual description of the device (synthetic functional description of the device).

The interface generator 12 detects the start and end of a troubleshooting session and creates a session log 26 which includes information generated between the start and end times. During the troubleshooting of a problem, the interface generator 12 may use the device model 28, and information coming from the device 16 concerning its status and configuration, to generate a virtual representation 30 of the device. The representation 30 shows components of the device that are to be manipulated by the user to address the user's problem. U.S. Pat. No. 7,715,037 describes one example of collaborative support technology developed to facilitate the troubleshooting work between a remote agent and a device user which involves a suitable shared virtual representation of the device. Such a shared representation 30 can be employed in the exemplary method for assisting the user during the troubleshooting session. The agent may utilize the shared representation to identify components of the device which the user should manipulate to solve the problem with the device that the user has conveyed to the agent. The user may use the shared representation to identify the physical components on the device 16 that are to be manipulated.

The interface generator 12 may be connected to the real device 16 to collect from it device data 32 including the information about the status of the device (for example, door or tray open for a printer, current screen for a graphical user interface). Throughout the session, data 32 describing the sequence of operations performed by the user on the actual device 16, the status of the device 16 between each of these steps, is collected and stored in the session log 26. The session log may also record data representing the operations performed on the virtual representation 30 of the device and/or voice recordings made by the user and/or agent.

Once a session is finished, the procedures editor 24 can decide to create a new procedure from the information collected in this session. The procedure generator 22 assists the editor 24 in various ways, including contextualization of the procedures, addition of missing steps, text generation and manual reviewing, as described below.

In the exemplary embodiment, the "user" 14 is a person who is proximate the physical device 16 in order to perform operations (manual actions) on the device corresponding to steps of an operating procedure or who is able to view the manual steps being performed by another person. The user can be the customer, a service technician, or the like. In some embodiments, the user also serves as the procedures editor 24 or may operate in cooperation with the procedures editor to review a candidate procedure generated from the session log 26.

In the example embodiment, the device 16 may be a printer or other electromechanical device. As used herein, a "printer" can include any device for rendering an image on print media using a marking material, such as ink or toner. A printer can thus be a copier, laser printer, bookmaking machine, facsimile machine, or a multifunction machine (which includes one or more functions such as scanning, archiving, emailing, and faxing in addition to printing). "Print media" can be a usually flimsy physical sheet of paper, plastic, or other suitable physical print media substrate for images.

Figure 2:
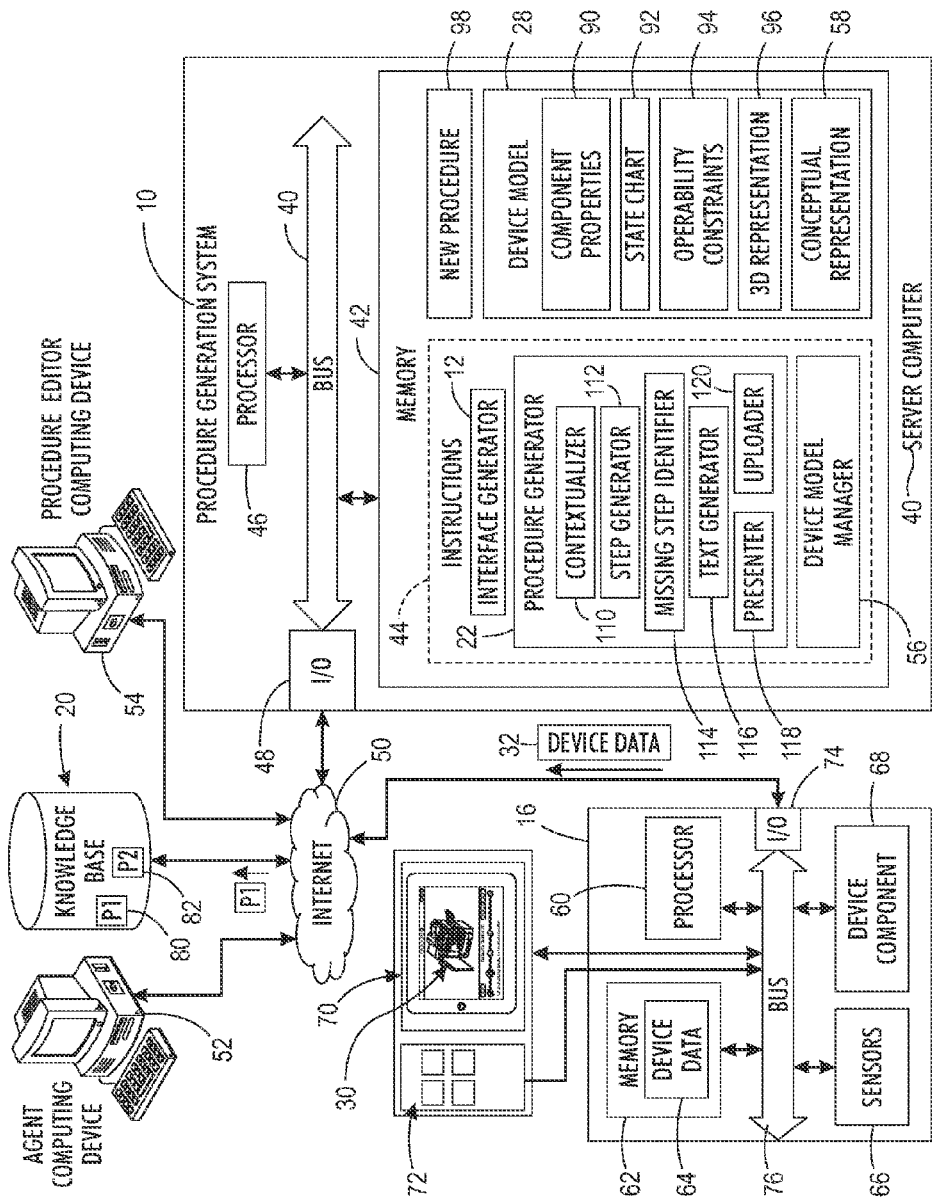
FIG. 2 is a functional block diagram of an environment in which a system for the semi-automatic generation of operating (maintenance/repair) procedures operates in accordance with one aspect of the exemplary embodiment.

FIG. 2 illustrates an exemplary computer-implemented system 10 of the type shown in FIG. 1 in greater detail. The system 10 includes one or more computing devices, such as the illustrated server computer 40. Non-transitory, computer-readable memory 42 stores instructions 44 for performing the exemplary method, including the interface generator 12 and procedure generator 22. A processor 46 in communication with the memory 42 executes the instructions. One or more input/output interfaces 48 allow the system 10 to communicate with external devices via a wired or wireless link 50, such as a cable, telephone line, local area network, or a wide area network, such as the Internet. The external devices may include an agent computing device 52, operated by the help desk agent 18, and a procedures editor computing device 54, operated by the procedures editor 24. While only one of each computing device is shown, it is to be appreciated that there may be many such computing devices. The knowledge base 20 may be hosted by the system 10, e.g., in memory 42, or by a remote server computer in communication with the system. The device model 28, for illustrative purposes, is stored in system memory 42, although in other embodiments, it may be hosted by a separate computer in communication with the system.

The instructions also include a device model manager 56, which is configured for keeping a conceptual representation 58 of the device 16 up-to-date with the actual device state, as identified from the device data 32. The conceptual representation 58 may be a part of the device model 28 or stored separately. It indicates the current states of each of the components represented in the device model 28. More particularly, during the troubleshooting session, each time a detected operation occurs on a component of the actual device 16 that is included in the device model 28, device data 32 including the new status corresponding to the performance of the operation, is output by the device 16. This information is received by the DMM 56 and the status of the conceptual representation 58 of the device model 28 is updated accordingly. In addition, the DMM is capable of making some inferences from the model 28. For example, given the state of a component in the device model, it can infer what other steps have to be completed before a given step can be performed. This assists in identifying the individual operations forming the sequence of operations which have been performed on the device during the troubleshooting session and can also be used during the session to support the interface generator 12 in updating the virtual representation 30.

As shown in FIG. 2, the device 16 operated on by the user includes a processor, such as a CPU 60, and memory 62, which at least temporarily stores device data 32 acquired from one or more sensors 66 associated with physical components 68 of the device 16. The device 16 includes a set of these components 68 on which a user can perform a respective operation or set of operations. The components 68 can each assume, at any one time, a given state from a finite set of states, such as open/closed, in/out, locked/unlocked, in place/removed, on/off, and the like. Each user operation generally involves only one single transition between two states of a component, such as one of: opening a door (closed to open), unlocking a locking mechanism (locked to unlocked), pulling out a drawer (in to out), removing a component (placed to removed), moving an electrical switch from on to off, and vice versa, and the like. The output device data 32, that is based on the information from the sensors 66, includes information on the status of the device 16, which includes the current states of each of these components 68 (to the extent that there is a sensor 66 for the component that is capable of detecting or inferring the current state). From this device data, a sequence of the individual operations performed by a user during a troubleshooting session can be reconstructed, based on the time at which each operation was performed (and recorded by the sensors).

The sensors 66 may be real and/or virtual sensors. Exemplary sensors include, for example, optical sensors, electrical sensors, mechanical sensors, magnetic sensors, temperature sensors, weight sensors, and combinations thereof, which can be used for detecting proximity or position of a component, obstructions, such as paper jams, motion, speed, magnetic field, electrical current/voltages, consumable amounts, temperature, e.g., overheating, and the like. In the case of a printer, for example, the physical components 68 may include doors, drawers, locking mechanisms, paper handling components, marking components (such as photoreceptors or ink jet heads), marking material supply containers (such as ink or toner cartridges), cleaning units, and the like. For a device such as a printer having a large number of such actionable components, there may be a large number of sensors, such as 50, 100, or more sensors 66, which provide sensor data from which individual performed operations can be identified. See for example, U.S. Pub. No. 20080126860, the disclosure of which is incorporated herein by reference, for examples of such sensors. It is assumed that there is a predefined set of operations performable by a user on the device, which are detectable by the device sensors 66, and that the existing operating procedures stored in the knowledge base 20 are each indexed according to the ones of these operations that are referred to in the steps of that operating procedure.

A display device 70, such as an LCD screen, is integral with or otherwise communicatively connected with the physical device 16 and provides a user with visual instructions for operating the device 16, including displaying the exemplary representation 30 of the procedure. An audible display device, such as a loudspeaker, may alternatively or additionally be provided for outputting the representation 30. A user input device 72, such as a key pad, keyboard, touch or writable screen, and/or a cursor control device, such as mouse, trackball, or the like, may be associated with the display device 70 for inputting text and for communicating user input information and command selections to the processor 60. An interface (I/O) 74 allows the device 16 to communicate with external devices via the wired or wireless network 50. The various components 60, 62, 66, 68, 70, 72, 74 of the device 18 may all be communicatively connected by a bus 76. The processor 60 may control the operation of the device 16 as well as implementing instructions for rendering the graphical representation 30 of a procedure on the display device 70. In other embodiments, the associated display device 70 and user input device 72 may be a part of a separate computer device (not shown), such as a mobile computing device, that is communicatively linked, e.g., via a wireless network, to the system 10 and/or device 16. The device 16 and/or associated display device 70 may also provide for voice communication between the user and the agent, or a separate communication link may be made, e.g., via a telephone line.

The computer system 10 may include one or more computing devices 40, such as a desktop, laptop, or palmtop computer, portable digital assistant (PDA), server computer, cellular telephone, tablet computer, pager, combination thereof, or other computing device capable of executing instructions for performing the exemplary method. Some or all of the instructions may be stored on the user's device 16 and/or on a computing device which is linked/linkable thereto for collecting device data 32.

The memory 42 may represent any type of non-transitory computer readable medium such as random access memory (RAM), read only memory (ROM), magnetic disk or tape, optical disk, flash memory, or holographic memory. In one embodiment, the memory 42 comprises a combination of random access memory and read only memory. In some embodiments, the processor 46 and memory 42 may be combined in a single chip. The network interface 48 allows the computer to communicate with other devices via a computer network, such as a local area network (LAN) or wide area network (WAN), or the Internet, and may comprise a modulator/demodulator (MODEM) a router, a cable, and and/or Ethernet port. Memory 42 stores instructions for performing the exemplary method as well as the processed data.

The digital processor 26 is a device which can be variously embodied, such as by a single-core processor, a dual-core processor (or more generally by a multiple-core processor), a digital processor and cooperating math coprocessor, a digital controller, or the like. The processor 46, in addition to controlling the operation of the computer 40, executes instructions 44 stored in memory 42 for performing the method outlined in FIGS. 3 and 4.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Other computing devices which are in communication with the system 10, including devices 16, 52, 54, may be similarly configured with memory and a processor.

Further details of the system will now be described.

Device Model

The device model 28 includes, for a given type of device, a model that, for each physical component 68 of the device, may contain the following information:

1. A list 90 of component properties that each describes either the configuration or the state of the given component.

2. A state chart 92 of all the operations that can be physically performed on the given component and their associated states.

3. A list 94 of operability constraints that specify the status requirements on other component(s) in order for an operation to be performed on the given component.

This information may be stored in memory 42, as illustrated in FIG. 2. Each component 68 has a unique identifier by which the properties, state chart, and operability constraints are indexed, such as the component's full name or an alphanumeric code. The device model 28 also includes a visual representation 96 of the device in which the components are visualized.

An example of such a device model 28 that may be used herein, is illustrated in above-mentioned US. Pub. No. 20130197899, incorporated by reference in its entirety, and is described briefly here.

1. Properties

The properties 90 of a component may describe:

1. Static characteristics of the respective component 68, such as a capacity for a container, or the device model type; and 2. Dynamic characteristics of the component that evolve according to the operations performed on this component, such as the content level for a container, the state of a door, drawer, or lock mechanism, or position of a removable component. The states of each component may be selected from a finite set of states, such as "open" and "closed," in the case of a door, "placed" and "removed," in the case of a drawer or removable component, such as a container, "locked" and "unlocked" in the case of a lock mechanism, or "satisfactory" and "low" in the case of a consumable level, such as toner, which is established to indicate or warn about a special state, e.g., consumable level low.

2. State Charts

Figure 5:
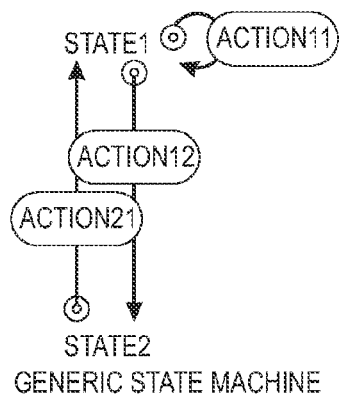
FIGS. 5-7 graphically illustrate finite state machines for exemplary device components.
Figure 6:
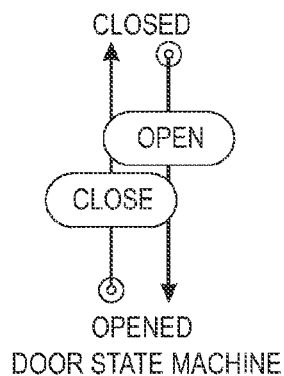
Figure 7:
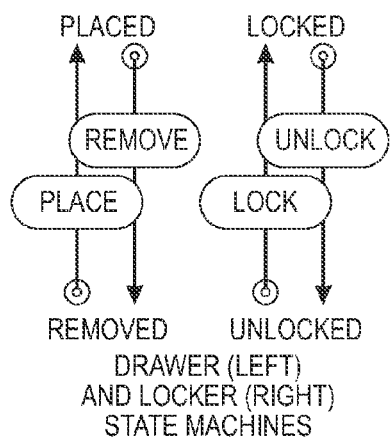

Each physically actionable component 68 of the device has an associated state chart, which can be in the form of a finite state machine, where transitions represent operations (actions) and the states are the different states for the component. FIGS. 5-7 show examples of state charts for some physical components. Each of the state charts links one or more actions performable on the component with first and second (or more) states assumed by the component before and after the action is performed. FIG. 5 shows a state chart for a generic machine which has two states, state 1 and state 2. Action 1.2 changes the state from state 1 to state 2, and action 2A does the reverse. An action 1.1 (corresponding to the action 2.1), if performed when the component is in state 1, has no effect. The door state chart illustrated in FIG. 6 gives a specific case where action 1.2 is opening the door and action 2.1 is closing the door. A sensor 66 associated with the door component on the device 16 may be configured for detecting at least one of these states (from which the other state can be inferred, if needed). For example, an optical, electrical, or mechanical sensor 66 detects when the door 68 is closed. FIG. 7 illustrates state charts for two interrelated components, a drawer and a locking mechanism for the drawer. The drawer can be placed (pushed in) or removed (pulled out) and the locking mechanism can be locked or unlocked. The components are interrelated because one or more states of one component is/are dependent on one or more states of the other component. However, the exemplary state chart 92 for a component 68 only considers actions and states of that component and does not deal with its interactions with the other components of the device 16, which are described by operability constraints 94.

3. Operability Constraints

An operability constraint 94 operates to prevent an action being performed on a component 68 unless another component of the device 16 is in a given state (the other component is assumed to be able to assume a plurality of states). For example, using the state chart illustrated in FIG. 7, a drawer is an exemplary component 68 that can be placed and removed and that is constrained by another component, a locking mechanism. The locking mechanism has two states: it can be locked and unlocked. The following operability constraints 94 can be defined for these two components:

1. The action "remove" cannot be performed on the drawer as long as the locking mechanism is in the "locked" status.

2. The action "lock" cannot be performed on the locking mechanism as long as the drawer is in the "removed" status.

The device model 28 also stores a visual representation 96 of the device 16. The visual representation 96 of the device 16 may include a 2D or 3D representation. The visual representation may include at least the physical components of the device that will be visible or actionable by a user in the context of performing the operating procedures on the device. In the case of a printer, for example, such a representation 96 may include components such as paper storage trays, access doors, moveable levers and baffles for accessing jammed sheets in the paper path, marking media replaceable containers, such as toner cartridges or ink containers, and waste toner receptacles, other replaceable items, such as cleaning units, photoreceptor belts, and fuser roll heaters, finisher components, such as collection trays, stapling devices, and the like. As well as visualizing these components, the 3D representation 96 may visualize appropriate user actions, such as opening doors, turning levels, lifting baffles and so forth which may be used to access and/or repair a component, e.g., in the form of an animation. The 3D visual representation 96 can be based, for example, on COLLADA™ open source software. This software application is a 3D graphics description format based on XML. The computed 3D model can be rendered by a viewer, such as one based on Adobe™ Flash technology, which offers 3D capabilities and which may be extended with additional 3D libraries, such as PAPERVISION 3D™.

Knowledge Base

The knowledge base 20 stores a set of textual operating procedures (P1, P2, etc.) 80, 82. The procedures 80, 82, etc. may each be indexed by a description of the procedure. Each procedure generally includes some steps, where a step represents an operation to be performed on the device. In some embodiments, each operating procedure includes a problem description, which briefly describes a known problem with the type of device, and one or more solution descriptions, each solution describing, in a sequence of steps, how to solve the problem. Each procedure may include a textual description of each of steps, describing the operations a user is to perform on the device in order to execute the procedure, and optionally also warnings about operations the user should not perform. The procedure steps of the knowledge base 20 may each have been indexed with a reference to a respective one operation defined in the device model 28 by using, for example, the method described in above-mentioned U.S. Pub. No. 20130197899. From the index, it is known, for example, which procedures describe one specific operation and for each of the matching procedures, which step of the procedure describes this operation.

Figure 3:
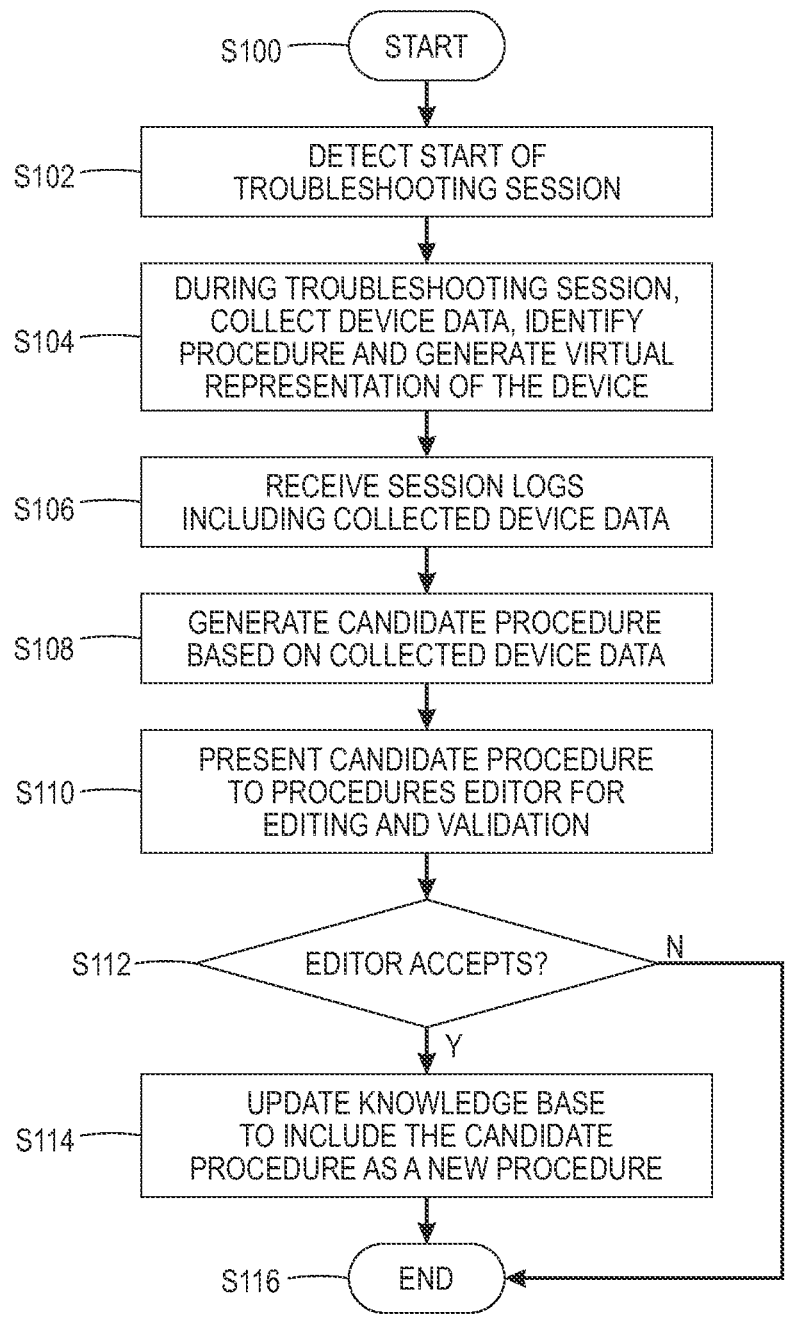
FIG. 3 is a flow chart illustrating a method for the semi-automatic generation of operating procedures in accordance with another aspect of the exemplary embodiment.

FIG. 3 illustrates a method which may be performed with the system of FIGS. 1 and 2. The method begins at S100.

At S102, a user 14 of a device starts a troubleshooting session, for example, by placing a telephone call to an agent, logging on a web portal for the system, pushing a button on the device 16, or the like. The collaborative troubleshooting interface generator 12 then makes communication with the device 16 and commences a timer for time stamping recorded actions. Voice communication between the user and agent, if participating in the session, may be via an audio link, such as a telephone line, which may feed directly to the device 16. During the troubleshooting session, the user attempts to solve a problem with the device, such as perform a maintenance or repair operation.

During the troubleshooting session, the agent 18 (or device user 14) may query the knowledge base 20 with key words describing a problem and retrieve a procedure which appears to relate to the problem with the device being faced by the user. In other embodiments, the interface generator 12 may use the device data 32 (e.g., current status of the device, such as alerts) to identify a possible problem with the device 16 and then automatically query the knowledge base 20, based on this information. The interface generator 12 automatically accesses the device model 28 to assist in formulating the query. A combination of automated and manual interactions may be used in some embodiments to specify the problem.

Figure 8:
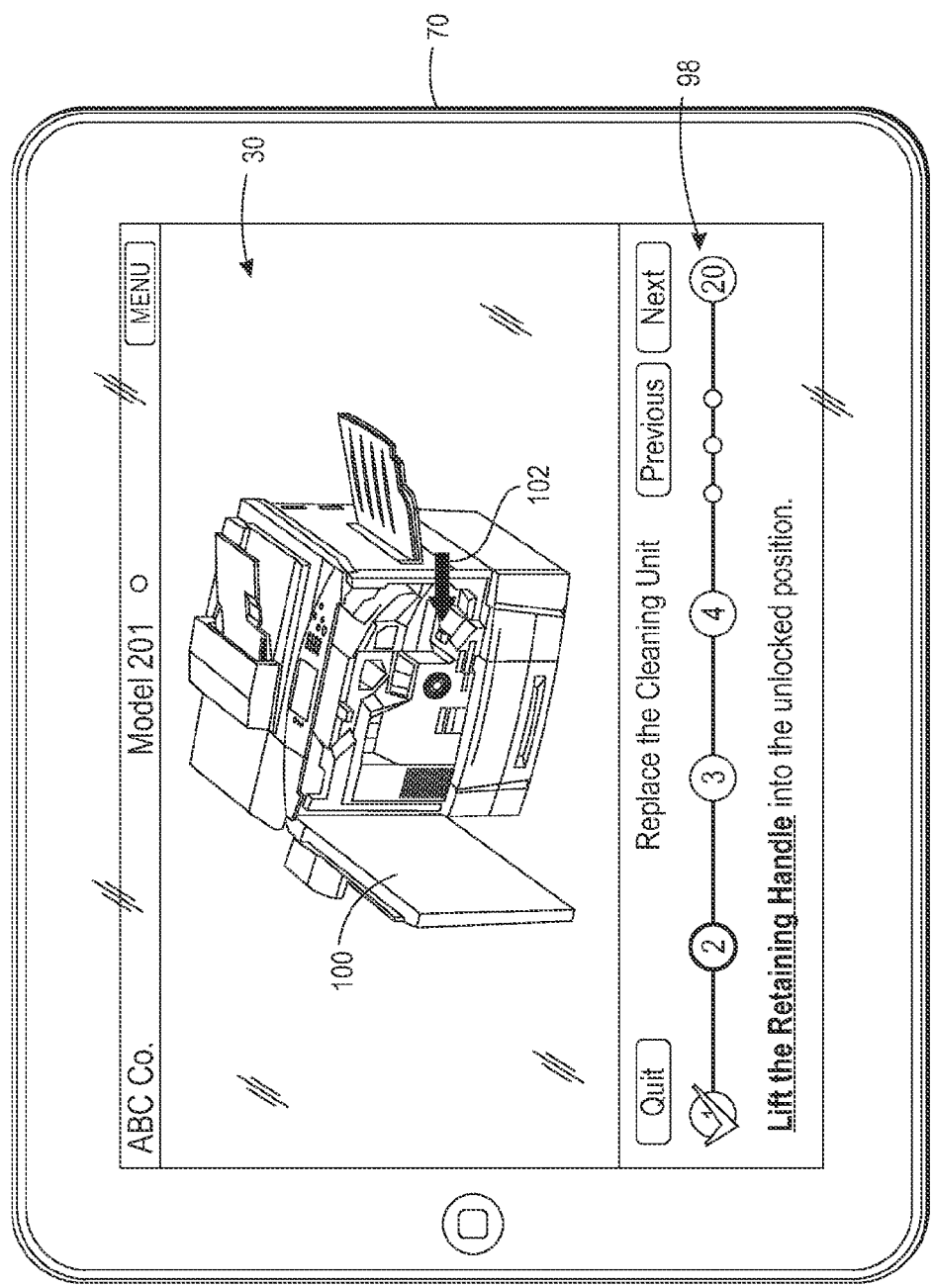
FIG. 8 is a screenshot of an example user interface for displaying a graphical representation of a device and a related operating procedure to a user.

The interface generator 12 uses the device model 28 and knowledge base 20 to provide instructions to the user via the graphical user interface 30. FIG. 8 illustrates an exemplary graphical user interface 30 for performing a procedure to replace the cleaning unit of a multifunction printer device 16.

The user interface generator 12 causes the display device 70 (as well as the agent's screen, if participating in the troubleshooting session) to display a 3D graphical representation 30 of the device 16 and the sequence 98 of steps (each step generally referring to only a single action) for the user to perform to execute a knowledge base operating procedure relating to the identified problem. In the screenshot illustrated in FIG. 8, the user has completed the first step, as indicated by the check mark, and is now being instructed to perform the operation: "lift the retaining handle." The graphical representation 30 shows the device as it will look after the first step has been completed, e.g., after the opening of the door 100, and identifies with an identifier 102, e.g., an arrow, color, highlighting, and/or a video sequence, the component on which the user needs to perform the action for completing the next step.

The agent, if participating in the troubleshooting session, may supplement the description with a voice instruction. In some cases, the procedure may not include all the steps that the user should perform or the knowledge base does not include a procedure which quite fits the problem faced by the user and thus the agent modifies the procedure from that shown or describes a new procedure for the user to perform which the agent anticipates may solve the problem. In some embodiments, the user may modify the displayed procedure to implement a new procedure. The displayed procedure may be modified by removing one or more steps of the displayed operating procedure, replacement of one or more of the steps, adding one or more new steps, changing the order of two or more of the steps, or a combination thereof.

When the troubleshooting session starts, the user interface generator 12 requests initial device data 32 from the device. The device data 32 initially received from the device may include configuration properties of the device (which components are present or missing in the user's particular configuration of the device), and well as device status properties, such as alerts, which indicate an abnormal status of the device, such as a missing component, consumable which needs to be replaced, detected paper jams, or the like. Additionally, the current device data 32 initially received from the device includes the initial state of each of the manually operable components of the device at that time, as recorded by the sensors. In some cases, the user may have begun an operating procedure without access to the knowledge base prior to initiating the troubleshooting session, such as by opening a door, pulling out a drawer, or other action that the user anticipates may be part of a solution to the problem. This information, if recorded by the sensors, can be used by the system to tailor the operating procedure that is presented to the user, for example, by omitting those steps of the operating procedure which the interface generator infers that the user has already performed.

At S104, the user 14 performs one or more operations on the device 16, at least some of which are detectable. Each detectable operation causes one of the components to change from a first of its known states to a second of its known states. The sensors 68 detect the operations performed by the user. These actions are recorded and time stamped and thus can be correlated, in some cases, with the properties of the device at the time (and optionally the time at which the instructions were given and/or displayed).

The user (or agent) may terminate the troubleshooting session, for example, when the steps have been performed on the device. In some embodiments, the troubleshooting session may be terminated automatically, for example after a predetermined time has elapsed from the last recorded user action. The interface generator 12 records the end time of the troubleshooting session. In some cases, provision is made for an acknowledgement to be received from the user or agent that the session was successful (or not).

At S106, the device data 32, together with input from the device model 28 and optionally also the knowledge base information displayed or verbally presented, is combined to generate the session log 26 for the troubleshooting session, which is input to the procedure generator 22 of the system.

At S108, the procedure generator 22 generates a candidate procedure based on the session log 26 for the troubleshooting session.

At S110, the candidate procedure is presented to the procedures editor 24 for editing and validation. The candidate procedure may be presented via a user interface displayed on the procedures editor's display device. If at S112, the procedures editor 24 accepts the candidate procedure (after optionally modifying it), it is uploaded to the knowledge base as a new knowledge base procedure 98 (S114).

The method ends at S116.

Further details of the method will now be described.

Procedure Generation (S108)

Figure 4:
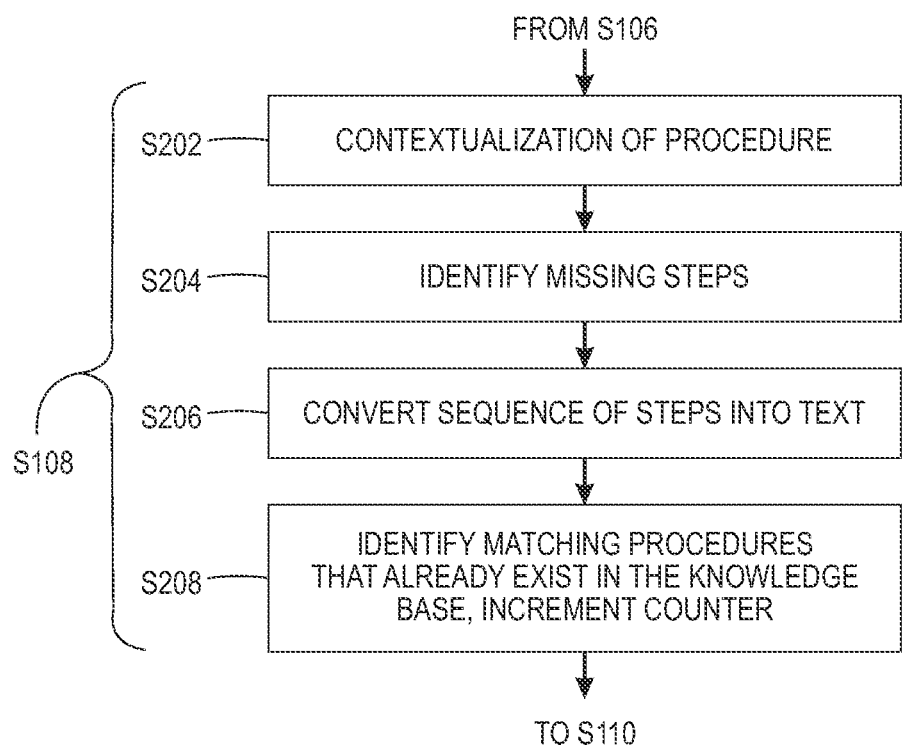
FIG. 4 is a flow chart illustrating procedures generation in the method of FIG. 3.

With reference to FIG. 2, the procedure generator 22 may include several software components (separate or combined), such as a contextualizing component (contextualizer) 110 which extracts relevant context from the device data for describing the problem, a step generator 112, which generates a sequence of steps based on the detected user actions, a missing step identifier 114 for identifying missing steps in the candidate operating procedure, a text generator 116 for comparing the sequence of steps with a set of procedures in the knowledge base 20 to identify similar operating procedures and incorporating textual information from matching steps into the candidate operating procedure, a presenter 118 for generating a graphical user interface for presenting the candidate operating procedure to a human editor, and an uploader 120 for uploading the candidate procedure to the knowledge base, after any modification and validation by the editor, as a new operating procedure. Procedure generation may thus include the following steps, as illustrated in FIG. 4:

1. Contextualization (S202)

This step includes finding relevant context to be associated with this candidate procedure. This is useful, in particular, for users of the knowledge base trying to retrieve a procedure relevant to a current problem. These elements of context may be extracted from the session log by looking at the status of the device at the beginning of the troubleshooting session. Contextual information extracted in this step can include one or more device properties selected from:

1. Configuration properties for the device, e.g., "firmware version" or "stapler installed," selected from a predefined set of configurations for the device.

2. Device status properties related to the current status of the device, e.g., "black ink level low" or "missing input tray 1."

There may be a long list of device status and configuration properties and only few of them may be symptomatic of the problem that the procedure is meant to solve. For this reason, some filtering may be performed to extract relevant properties. The filtering may be rule-based. Example rules are as follows:

1. Retain the device status properties which are classed by the device 16 (or the system) as being active alerts, since they represent abnormal status of the device.

2. Retain only the configuration properties and device status properties (other than alerts) which refer to components of the device which were operated on during the procedure.

The retained properties may be presented to the procedures editor 24 for review, via the user interface 120. The editor selects which ones to keep attached to the procedure and this information is received by the procedures editor.

The retained properties may be automatically converted to a textual description of the problem 126, such as: "for devices that include a black ink cartridge, when the device is providing an alert that black ink level is low, the following procedure is used," the highlighted portions being derived from a device status property black ink level low and a configuration property related to this status property (device includes black ink cartridge).

The editor 24 may subsequently edit this automatically-generated description, e.g., after reviewing the generated candidate procedure.

Additionally, the context of the device at the end of the session may be used to determine if the problem was fixed. For example, if an alert for "black ink level low" is removed by the end of the session, the procedure generator 22 can infer that the sequence of operations performed by the user solved the problem of low black ink and generate a problem statement 126 for the candidate operating procedure which refers to this problem.

2. Identification of Missing Steps (S204)

The sequence of operations stored in the session log 26 is examined to identify missing steps. The sequence of (detected) operations performed on the device 16 during the troubleshooting session is first extracted from the respective session log 26. The session logs 26 often capture only a partial view of the actual steps that were performed on the device. Missing procedure steps may be due to several reasons, such as the troubleshooting session starting after some operations have already been performed on the device 16. Some steps may be missing because they were not illustrated as being performed on the virtual representation of the device and/or when performed on the actual device, either these operations are not detectable by a sensor 66 or the sensor which normally detects the performed step may be malfunctioning.

Some of the missing steps can be reconstructed using operability constraints taken from the conceptual representation 58 of the device model 28. The procedure generator 22 analyzes the sequence of detected operations in the session log and determines if they are possible, using the device model 28. Each time an action is extracted from the session log 26 which is determined to have required a previous action which was not in the session log, a step corresponding to this action can be added to the procedure steps. For example, if at the start of the session, the cleaning unit is in a "removed state," the procedure generator 22 may infer that the door to the cleaning unit component of the device has already been opened and the cleaning unit has been removed, since there is an operability constraint 94 which specifies that the cleaning unit cannot be removed without first opening the cleaning unit door, so steps for these two actions may be added to the procedure. This approach does not guarantee that all the missing actions that were performed on the device are reconstructed. However, it ensures that sequences of steps proposed in the candidate procedure are achievable because they do not violate any of the operability constraints of the device.

Text Generation (S206)

Once the sequence of steps for a procedure has been reconstructed from the session log and missing steps, if any, have been identified, the sequence of steps is translated into a textual procedure which is readable by a user of the knowledge base. This may be performed, for example, by re-using segments of text described in already existing procedures of the knowledge base. This has the following advantages:

1. It provides a textual description of a step that was initially written by a human editor and which has therefore a richer syntax than the way in which the actions are stored.

2. It provides not only a description of the operation to be performed but it may also be associated with some warnings or tips to perform the operation.

3. It helps to keep a consistency in style and terminology across the knowledge base.

One method of performing this step is as follows: A search is made of the knowledge base for one or more existing procedures with steps matching all or part of the sequence of steps in the new candidate procedure. Each of the procedures in the knowledge base is annotated with steps and indexed according to the operation(s) being performed in each step. Thus, a sequence of one or more operations forming a step can be matched to a step of an operating procedure stored in the knowledge base. Those knowledge base procedures which match the longest sequence(s) of steps of the candidate procedure are retrieved. The matching procedures may be retrieved from among the procedures for the same device model or from procedures of a different device model which shares some common components with this device model.

If all the steps of the candidate procedure exactly match a single existing procedure in the knowledge base then a prompt may be provided to the editor that the procedure already exists in the knowledge base (S208). Optionally, a counter for this particular knowledge base procedure may be incremented to monitor how frequently the procedure has been matched with a procedure identified from a troubleshooting session. This can help to identify problems faced by users which are frequently occurring, allowing designers to focus on ways to modify the device in the present model or in a future model, to reduce the need for troubleshooting.

If only a subpart of the sequence of steps matches steps of one or more procedures in the knowledge base, then fragments of two or more knowledge base procedures may be combined in order to describe the steps of the candidate procedure. The fragments may be selected so that the largest continuous fragments (most steps) are used as a priority and such that the selected fragments in the existing procedure are positioned in close proximity to the sequence of steps to be generated in the new procedure (e.g., steps which occur at or near the end of a knowledge base procedure are associated with steps at or near the end of the candidate sequence of steps).

This approach is useful in order to limit the inconsistencies of the transitions from one fragment to another in the newly created procedure.

As an example, let A, B, C, D, E, F and G represent steps in existing operating procedures. Assume that the recorded procedure, after any reconstructing of missing steps, consists of the sequence of steps: F-G-B-C-D. Let the closest matching procedure found in knowledge base be A-B-C-D-E and another close matching procedure found in knowledge base be F-G. The text for the candidate sequence can thus be generated from these two sequences as F-G-B-C-D-E. Note that although the step E is not in the recorded procedure, it may be included in the candidate sequence as possibly having been an unrecorded step. As shown in this example, the procedures editor may combine parts of two or more existing procedures to match the sequence of steps.

For each of these matching steps, the textual description, and any associated information, such as a video sequence and/or links to a part of the 3D representation, is/are retrieved from the knowledge base and used to form the respective step of the candidate procedure. For each of the steps of the created procedure, the procedure generator may associate the actual time that was tracked during the completion of the associated operation within the troubleshooting session. This information is useful to users of the knowledge base as it is indicative of how much time they are likely to need spend on each of the steps of the procedure and on the overall procedure.

At the end of this step, the sequence of steps has been translated into a user-friendly textual description of a procedure.

Manual Reviewing (S110)

Figure 9:
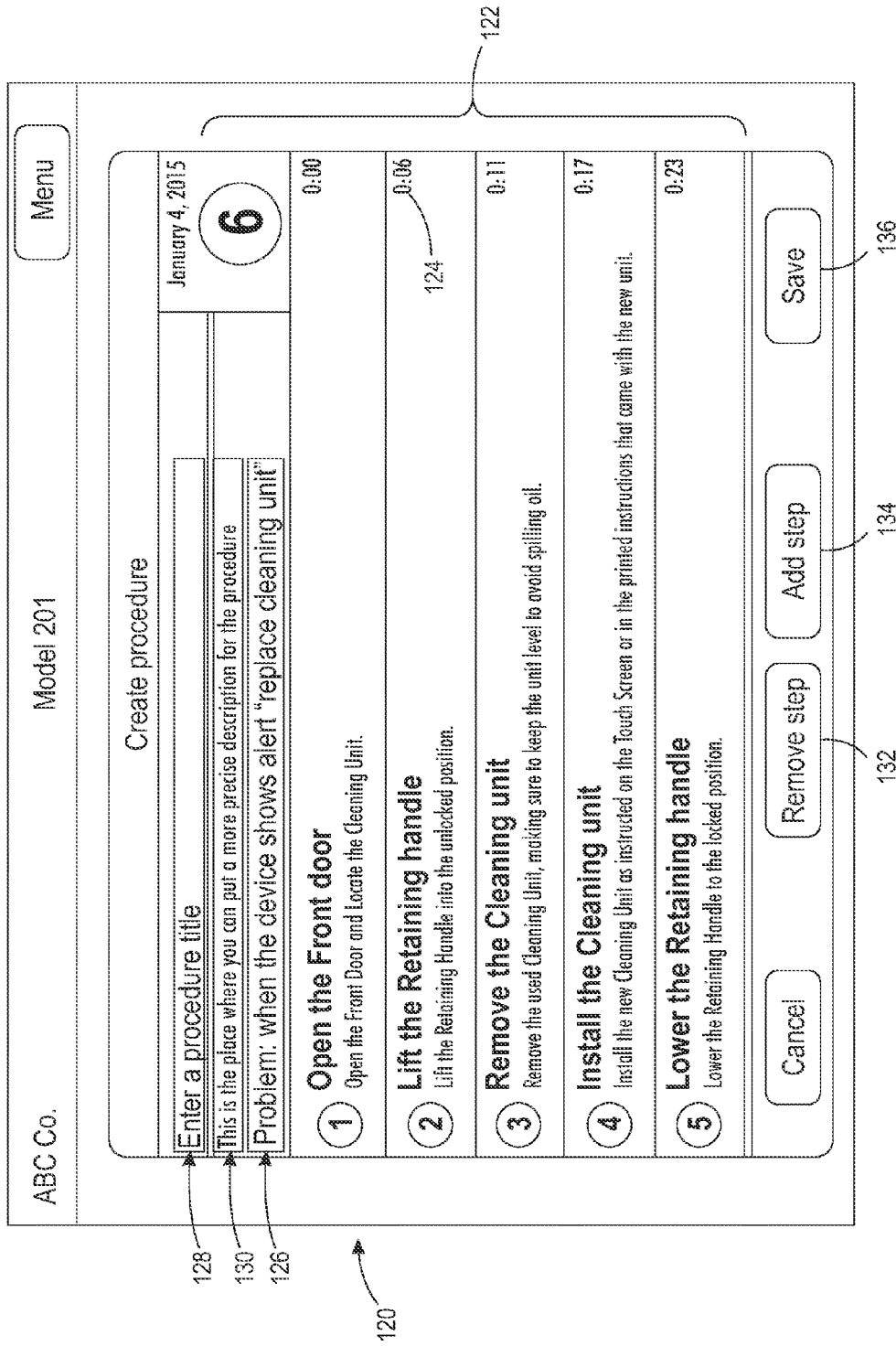
FIG. 9 is a screenshot of an example user interface for displaying a candidate operating procedure to an editor.

This can be seen as the last step of the procedure generation and includes presenting the candidate procedure generated automatically from the log to the editor 24 and providing for an assisted review of the candidate procedure by the editor. FIG. 9 illustrates an exemplary graphical user interface 120 which enables the procedures editor 24 to interact with the system to edit a candidate procedure 122. The candidate procedure may include a sequence of two or more steps, with an associated time 124 for each step, e.g., relative to a start time for the procedure, indicating the start or end time for the step, derived from the time stamps for the corresponding operations performed by the user, stored in the session log. The user interface 120 may display the problem statement 126 generated in the contextualizing step and provide text entry boxes 128, 130 for the editor to type in a title for the procedure and a description of the procedure. Actuable areas of the screen, such as buttons 132, 134, 136, may be provided to assist the editing and provide for the procedure to be validated and saved.

It is to be appreciated that some steps which were performed during a troubleshooting session may not have proved useful for solving the problem with the device. These unnecessary steps may form part of the generated candidate procedure and can be removed by the editor. For example, the editor may highlight the step to be removed and click on a "remove step" button 132 or use another suitable selection mechanism. When a step is removed, the procedure generator 22 keeps track of the operability constraints 94 of the device model 28 and therefore it removes all steps which are no longer possible once the initial step has been removed.

Optionally, the system 10 can report the steps that were performed during the session but removed by the editor during the reviewing process. This could indicate that such a step is a common mistake that users may do when operating the device. Therefore, rather than simply removing the step, it may be turned into a warning in the procedure, e.g., saying: 'please avoid performing . . . '.

In addition to providing for the editor 24 with an interface for removing unnecessary steps, the interface 120 may provide the editor with the opportunity to add steps that might not have been tracked by the automatic generation process or customize the wording of any of the steps. For example, FIG. 9 shows an "add step" button 134 which an editor can click on to add an additional step, for example, after a highlighted one.

Once the editor validates the candidate procedure, e.g., by clicking on the save button 136, it is added to the knowledge base 20 as a new procedure. The new procedure is indexed by the user actions to which the steps refer. The new procedure 98 may thereafter be accessed in a later troubleshooting session when a new user is attempting to solve a problem with a device of the same type.

The exemplary embodiment thus described provides a method to generate a textual procedure from a session log of a troubleshooting system that uses a virtual environment. While methods have been proposed for generating procedures from recordings of live audio (and or visual) streams, a difficulty with that approach is that it does not generate procedures that are automatically segmented into steps, nor is it feasible for them to be annotated or indexed according to the operations being performed in each of the steps. This makes it difficult to create a fully indexed procedure in a knowledge base which relates to a particular problem. Extensive manual segmentation of the video streams, which is very labor intensive, may thus be needed.

The exemplary method provides for improved technical support of devices in a variety of fields, such as document generation and other businesses, such as household appliance, personal computer, and mobile phone servicing where technical support is provided from call centers on behalf of a manufacturer or retailer of the product to users. Servicing electromechanical devices, such as printers, is a significant cost to the manufacturer or service contract provider. The exemplary system enables such costs to be reduced by providing customers with a more comprehensive tool to support troubleshooting when they try to solve a problem they are experiencing with a device. The system can also assist the customer or a technician to perform maintenance operations. As a result, the procedure can be performed more efficiently and accurately by the user.

While the device 16 has been described in terms of a printer, it is to be appreciated that the system and method are applicable to other types of device without being closely integrated with the device and may be provided as a service to customers wishing to implement technical documentation for a device in a more convenient format for the user.

The method illustrated in FIGS. 3 and/or 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 3 and/or 4, can be used to implement the method for generating an operating procedure.

Without intending to limit the scope of the exemplary embodiment, the following example illustrates application of the method in the context of troubleshooting for multifunction printing devices.

Example

In the example, the procedure generator 22 was provided through a tablet computer which can be used by a user in a self-help or collaborative context. An interface 120 analogous to that shown in FIG. 9 was used to display the output of the procedure automatically generated after a session where the user was replacing the cleaning unit of the device. The interface shown in FIG. 9 illustrates the five steps that where reconstructed from the session log together with the text that was generated for each of the steps by looking at procedures previously existing in the knowledge base. In this particular example, steps 2 and 5 of the candidate procedure were not extracted from the log because the retaining handle of this model does not have a sensor associated with its position. These two steps were inferred from the operability constraints of the underlying device model.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A computer program product comprising a non-transitory recording medium storing instructions, which when executed on a computer, cause the computer to perform a method for generating new operating procedures for maintenance or repair of a device comprising:
receiving a log of a troubleshooting session in which a user has performed operations on the device, the session log including data from the device, the device data including a sequence of detected operations performed on the device, each detected operation causing a component of the device to change states;
generating steps of a candidate operating procedure for maintenance or repair of the device based on the log, each of the steps of the candidate operating procedure corresponding to one of the detected operations;
providing for identifying missing steps of the candidate operating procedure based on a device model which includes at least one of state charts for a plurality of components of the device and stored operability constraints that specify the state of another component in order for an operation to be performed on a given component, and, where a missing step is identified, adding a corresponding step to the candidate operating procedure;
translating the sequence of steps of the candidate operating procedure into a textual candidate operating procedure, comprising comparing the candidate operating procedure with existing operating procedures stored in a knowledge base for the device to identify at least one existing operating procedure which includes steps which match at least some of the steps of the candidate operating procedure and, based on the identified at least one existing operating procedure, generating a textual description of the operating procedure based on the textual description of the matching steps, wherein when the identified at least one existing operating procedure comprises at least two existing operating procedures, providing for combining fragments of the at least two existing operating procedures to describe the steps of the candidate procedure; and
providing for presenting the candidate operating procedure to an editor for validation as a new operating procedure.

2. The computer program product of claim 1, wherein the knowledge base includes a plurality of operating procedures, each including a plurality of steps, each of the plurality of steps corresponding to an operation performed on a device, and wherein the plurality of operating procedures are each indexed according to the operations corresponding to the steps of the operating procedure.

3. The computer program product of claim 1, wherein the device data includes initial states for each of a plurality of components of the device.

4. The computer program product of claim 1, wherein the device data includes device status properties, the device status properties including alerts, when generated by the device, which indicate an abnormal status of the device.

5. The computer program product of claim 1, wherein the session log is received from an interface generator which provides access to the knowledge base during the troubleshooting session.

6. The computer program product of claim 1, wherein the components of the device on which the operations are performed each has a predefined set of states.

7. The computer program product of claim 6, wherein for at least one of the components, the predefined set of states is selected from the group consisting of:
placed and removed;
open and closed; and
locked and unlocked.

8. The computer program product of claim 1, wherein the device includes a plurality of sensors, each of the sensors detecting operations performed on a respective component.

9. The computer program product of claim 1, wherein providing for identifying missing steps comprises providing for identifying at least one of:
an initial state of a component at the start of the troubleshooting session, the initial state and the device model indicating that an operation has been performed on the component prior to the start of the troubleshooting session; and
an operation performed on a component for which there is an operability constraint that specifies the state of another component in order for that operation to be performed on a given component and the session log does not include a record of the other component having been changed to the specified state.

10. The computer program product of claim 1, further comprising providing for detecting when the editor deletes one of the steps of the candidate operating procedure and when the editor deletes a step, generating a textual description in another step which indicates that performance of the deleted step is to be avoided.

11. The computer program product of claim 1, wherein when the editor validates the candidate operating procedure, generating a new operating procedure in the knowledge base based on the candidate operating procedure.

12. The computer program product of claim 1, wherein the providing for presenting the candidate operating procedure to an editor for validation comprises generating a graphical user interface for display to the editor on a display device which represents the candidate operating procedure as a sequence of steps.

13. The computer program product of claim 1, wherein during the troubleshooting session, a graphical user interface is generated for display to the user which illustrates an operating procedure in the knowledge base as a sequence of steps to be performed on the device.

14. The computer program product of claim 13, wherein the device model includes a conceptual representation of the device which is updated, during the troubleshooting session, by a device model manager to reflect a current state of components in the device model, based on the data received from the device, the updates being provided to an interface generator which generates the graphical user interface.

15. The computer program product of claim 1, wherein the method further comprises extracting contextual information from the device data and creating a problem statement based on the device data.

16. The computer program product of claim 1, wherein the device comprises a printer.

17. A system comprising memory which stores instructions for performing a method for generating new operating procedures and a processor, in communication with the memory, for executing the instructions, the method comprising: receiving a log of a troubleshooting session in which a user has performed operations on a device for maintenance or repair of the device, the session log including data from the device, the device data including a sequence of detected operations performed on the device, each detected operation causing a component of the device to change states; generating steps of a candidate operating procedure based on the log, each of the steps of the candidate operating procedure representing an operation to be performed on the device and corresponding to one of the detected operations; providing for identifying missing steps of the candidate operating procedure based on a device model which includes at least one of state charts for a plurality of components of the device and stored operability constraints that specify the state of another component in order for an operation to be performed on a given component; comparing the candidate operating procedure with existing operating procedures stored in a knowledge base for the device to identify at least one existing operating procedure which includes steps which match at least some of the steps of the candidate operating procedure; if all the steps of the candidate procedure exactly match a single existing procedure in the knowledge base, providing a prompt that the procedure already exists, otherwise, based on the identified at least one existing operating procedure, generating a textual description based on the textual description of the matching steps, and wherein when the identified at least one existing operating procedure comprises at least two existing operating procedures which, in combination, match the steps of the candidate operating procedure, providing for combining fragments of the at least two existing operating procedures to describe the steps of the candidate procedure; and providing for uploading the candidate operating procedure to a knowledge base as a new operating procedure.

18. A system for generating new operating procedures for repair or maintenance of a device, comprising: memory which stores a device model, the device model including state charts for a plurality of components of the device and operability constraints for at least some of the components; a procedure generator which: receives a log of a troubleshooting session in which a user has performed operations on a device, the log including data from the device, the device data including a sequence of detected operations performed on the device, each detected operation causing a component of the device to change states, generates steps of a candidate operating procedure for maintenance or repair of a device based on the log, each of the steps representing an operation to be performed on the device and corresponding to one of the detected operations, identifies missing steps of the candidate operating procedure based on the device model, and compares the candidate operating procedure with existing operating procedures stored in an associated knowledge base for the device to identify at least one existing operating procedure which includes steps which match at least some of the steps of the candidate operating procedure and, when only a subpart of the sequence of steps matches steps of one or more existing operating procedures in the knowledge base and when the identified at least one existing operating procedure comprises at least two existing operating procedures which, in combination, match the steps of the candidate operating procedure, generates a textual description based on a combination of fragments of the identified at least two existing operating procedures; and generates a graphical user interface for presenting the candidate operating procedure to an editor for validation; and a processor in communication with the memory which implements the procedure generator.

19. A method for generating new operating procedures comprising: with an interface generator, conducting a troubleshooting session in which a user receives instructions based on operating procedures stored in a knowledge base and performs operations on a printing device; with the printing device, generating a log of the troubleshooting session, the log including data from the device, the device data including a sequence of detected operations performed on the device, each detected operation causing a component of the device to change states; with a computer processor, generating steps of a candidate operating procedure based on the log, each of the steps of the candidate operating procedure representing an operation to be performed on the device and corresponding to one of the detected operations; with a computer processor, comparing the candidate operating procedure with existing operating procedures stored in a knowledge base for the device, each of the existing operating procedures including a sequence of steps, each of the steps of the existing operating procedure representing an operation to be performed on the device, to identify at least one existing operating procedure which includes steps which match at least some of the steps of the candidate operating procedure and, when only a subpart of the sequence of steps matches steps of one or more procedures in the knowledge base and when the identified at least one existing operating procedure comprises at least two existing operating procedures which, in combination, match the steps of the candidate operating procedure, generating a new operating procedure textual description, based on a combination of fragments of the at least two existing operating procedures to describe the steps of the candidate procedure; and outputting the new operating procedure.

* * * * *